US011606769B2

(12) United States Patent
Issakov et al.

(10) Patent No.: US 11,606,769 B2
(45) Date of Patent: Mar. 14, 2023

(54) SIM-BASED POSITIONING

(71) Applicant: Skyhook Wireless, Inc., San Diego, CA (US)

(72) Inventors: Simon Issakov, Wayne, PA (US); Robert J. Anderson, Bryn Mawr, PA (US)

(73) Assignee: Skyhook Wireless, Inc., San Diego, CA (US)

( * ) Notice: Subject to any disclaimer, the term of this patent is extended or adjusted under 35 U.S.C. 154(b) by 0 days.

(21) Appl. No.: 16/840,029

(22) Filed: Apr. 3, 2020

(65) Prior Publication Data
US 2021/0314901 A1    Oct. 7, 2021

(51) Int. Cl.
*H04W 64/00*  (2009.01)
*H04W 12/037* (2021.01)
*H04W 4/14*   (2009.01)
*H04W 8/24*   (2009.01)

(52) U.S. Cl.
CPC .............. *H04W 64/00* (2013.01); *H04W 4/14* (2013.01); *H04W 8/245* (2013.01); *H04W 12/037* (2021.01)

(58) Field of Classification Search
CPC ... H04W 64/00; H04W 12/0017; H04W 4/14; H04W 8/245
See application file for complete search history.

(56) References Cited

U.S. PATENT DOCUMENTS

| 8,290,496 B2 | 10/2012 | Segall et al. |
| 8,340,630 B1 | 12/2012 | Ward |
| 8,384,595 B2 | 2/2013  | Mia et al. |

(Continued)

FOREIGN PATENT DOCUMENTS

WO    WO-2008/055302 A1    5/2008

OTHER PUBLICATIONS

Khan, Nauman H., et al., "A Distributed Application Model for Mobile Networks," IEEE, Multi Topic Conference, Proceedings IEEE INMIC 2003, 7th International Islamabad, Pakistan, Dec. 8-9, 2003, pp. 157-163.

(Continued)

*Primary Examiner* — Muthuswamy G Manoharan
(74) *Attorney, Agent, or Firm* — Skyhook Wireless, Inc.

(57) ABSTRACT

In various embodiments, techniques are provided for deploying a positioning applet to a SIM (e.g., a physical SIM card or an embedded SIM (eSIM)/integrated SIM (iSIM)) via an over-the-air (OTA) update or by permanent programming (i.e. "burning in") during manufacture. The positioning applet may run solely on a processor of the SIM, functioning without support of application, OS or baseband software executing on the CPU or baseband processor of the UE, or network deployed infrastructure support. In operation, the positioning applet collects positioning measurements from a baseband processor (e.g., a baseband chipset) of the UE (e.g., via 3GPP protocols) which are sent (e.g., as an encrypted payload) to a remote location platform that compares the positioning measurements to known positioning data in a database (e.g., a crowd sourced database) to determine UE position. The remote location platform may provide an estimated position to a designated recipient system, without involvement of the UE.

40 Claims, 6 Drawing Sheets

(56) References Cited

U.S. PATENT DOCUMENTS

| | | |
|---|---|---|
| 8,526,391 B2 | 9/2013 | Issakov et al. |
| 8,627,484 B2 | 1/2014 | Beckley et al. |
| 8,660,015 B2 | 2/2014 | Issakov et al. |
| 8,738,010 B2 | 5/2014 | Segall et al. |
| 9,060,281 B2 | 6/2015 | Issakov et al. |
| 9,078,145 B2 | 7/2015 | Issakov et al. |
| 2008/0182621 A1 | 7/2008 | Morman |
| 2009/0088181 A1* | 4/2009 | Savolainen ............ G01S 5/0018 455/456.1 |
| 2010/0210304 A1* | 8/2010 | Huslak ................. H04L 67/306 455/558 |
| 2012/0015670 A1 | 1/2012 | Boyer et al. |
| 2015/0312717 A1* | 10/2015 | Shih ...................... H04W 64/00 455/456.1 |
| 2016/0261980 A1* | 9/2016 | Drexel .................... H04W 4/02 |
| 2018/0077556 A1* | 3/2018 | Bienas ................. H04W 8/005 |
| 2020/0163154 A1* | 5/2020 | Park ...................... H04W 80/12 |
| 2020/0314629 A1* | 10/2020 | Kreishan ............... H04W 48/18 |

OTHER PUBLICATIONS

"Notification of Transmittal of the International Search Report and the Written Opinion of the International Searching Authority, or the Declaration," International Filing Date: Mar. 26, 2021, International Application No. PCT/US2021/024321, Applicant: Skyhook Wireless, Inc., dated Jul. 6, 2021, pp. 1-13.

* cited by examiner

SIM-BASED POSITIONING

BACKGROUND

Technical Field

The present disclosure relates generally to user equipment (UE) positioning, and more specifically to a positioning applet deployable on a subscriber identification module (SIM) of UE.

Background Information

Determining UE position is becoming increasing important for tracking users, managing cellular profiles, providing value-added services, and other tasks. To determine UE position, two categories of techniques have generally been used: application, operating system (OS) or baseband software install-based positioning and network-based positioning. In application, OS or baseband software install-based positioning, a piece of application, OS or baseband software is pre-installed or user-installed on a UE and executed on the central processing unit (CPU) or baseband processor of the UE to collect positioning measurements. These positioning measurements can be compared, either locally or on a remote server, to known positioning data to determine the UE's position. In order to operate, the application, OS or baseband software needs to be installed. However, some parties, for example, cellular network operators may have limited control over what application, OS or baseband software is installed on the UE that utilize their network. Original equipment manufacturers (OEMs) may remotely provision device subscriptions for cellular network services of a network operator. For example, using embedded SIM (eSIM) or integrated (iSIM) technology, an OEM has the flexibility to, at any moment, remotely switch the cellular network used (for example, based on a best available subscription in a country). The cellular network operator may have little ability to require pre-installed application, OS or baseband software on a UE that are caused to use its network. Likewise, a cellular network operator may not rely on user cooperation to actively install application, OS or baseband software, as their ability to control end user behavior may be limited.

In network-based positioning, infrastructure is deployed in an operator network that determines UE positions, typically according to 3rd Generation Partnership Project (3GPP) standards. For example, a network element referred to as a Serving Mobile Location Center (SMLC) may be deployed. A SMLC typically controls several location measurement units (LMUs), which measure radio signals to help find UE in the area served by the SMLC. The SMLC typically communicates with external clients via an interface, referred to as a Gateway Mobile Location Centre (GMLC). Some parties, for example some network operators, may not have the ability, or the desire, to deploy such infrastructure, or their deployed infrastructure may lack the ability to determine UE position to a desired level of accuracy or the capacity to determine position for all UE. For example, where the UE is IOT devices, the number of devices may be huge and network-based positioning may not have the required capacity.

Accordingly, there is a need for improved techniques that can address these and/or other shortcomings of application, OS or baseband software install-based positioning and network-based positioning.

SUMMARY

In various embodiments, techniques are provided for deploying a positioning applet to a SIM (e.g., a physical SIM card or an eSIM/iSIM via an over-the-air (OTA) update or by permanent programming (i.e. "burning in") during manufacture. The positioning applet may run solely on a processor of the SIM, functioning without support of application, OS or baseband software executing on the CPU or baseband processor of the UE, or network deployed infrastructure support. In operation, the positioning applet collects positioning measurements from a baseband processor (e.g., a baseband chipset) of the UE (e.g., via 3GPP protocols) which are sent (e.g., as an encrypted payload) to a remote location platform that compares the positioning measurements to known positioning data in a database (e.g., a crowd sourced database) to determine UE position. The remote location platform may provide an estimated position to a designated recipient system, without involvement of the UE.

The technique may enable network operators to locate and track users, managing cellular profiles, provide value-added services, and perform other tasks, without cooperation from OEMs or active participation or even knowledge of end users. The technique may be network independent and device agnostic. It may avoid a need for passive monitoring of links in the operator network or direct access to nodes of the operator network, thereby reducing integration costs, version dependencies, and time to deploy, among numerous other benefits.

In one embodiment, a method implemented on UE is provided that involves executing a positioning applet on the SIM of the UE. The positioning applet collects positioning measurements from a baseband processor of the UE that include characteristics of observed cells and/or information determined based on observed global navigation satellite system (GNSS) satellites. The positioning applet packs the positioning measurements into a payload of a packet and causes the UE to transmit the packet via a communication path to a location platform that estimates position of the UE.

In another embodiment, a method implemented on a network operator backend system involves deploying a positioning applet to a SIM of UE that is configured to collect positioning measurements for the UE and transmit the positioning measurements to a location platform. The positioning measurements include characteristics of observed cells and/or information determined based on observed GNSS satellites. The network operator backend system receives an estimated position of the UE from the location platform and uses the estimated position of the UE to track users, manage cellular profiles, provide value-added services, or for other purposes.

In another embodiment, a method implemented on a location platform involves receiving, from a positioning applet executing on the SIM of the UE, positioning measurements for the UE that include characteristics of observed cells and/or information determined based on observed GNSS satellites. The location platform estimates the position of the UE based on the positioning measurements and provides an estimated position of the UE to a designated recipient system separate from the UE, while withholding the estimated position from the UE itself.

In another embodiment, a SIM includes storage that holds a positioning applet and a processor configured to execute the positioning applet. The positioning applet when executed on the SIM is configured to collect positioning measurements including characteristics of observed cells and/or information determined based on observed GNSS satellites, pack the positioning measurements into a payload of a packet, and cause the packet to be transmitted from the UE via a communication path to a location platform that estimates position of the UE.

In still another embodiment, a non-transitory electronic device readable media has software stored thereon. The software when executed solely on a processor of the SIM of UE is operable to collect positioning measurements from a baseband processor of the UE including characteristics of observed cells and/or information determined based on observed GNSS satellites, pack the positioning measurements into a payload of a packet; and cause transmission of the packet from the UE via a communication path to a location platform that estimates position of the UE.

It should be understood that the embodiments discussed in this Summary may include a variety of other features, including other features discussed below, and variations thereof. Further a variety of other embodiments may be utilized involving various combinations of the features discussed herein and below, and variations thereof. This Summary is intended simply as a brief introduction to the reader and does not imply that the specific features mentioned herein are all the features of the invention or are essential features of the invention.

BRIEF DESCRIPTION OF THE DRAWINGS

The description below refers to the accompanying drawings, of which.

DETAILED DESCRIPTION

Figure 1:
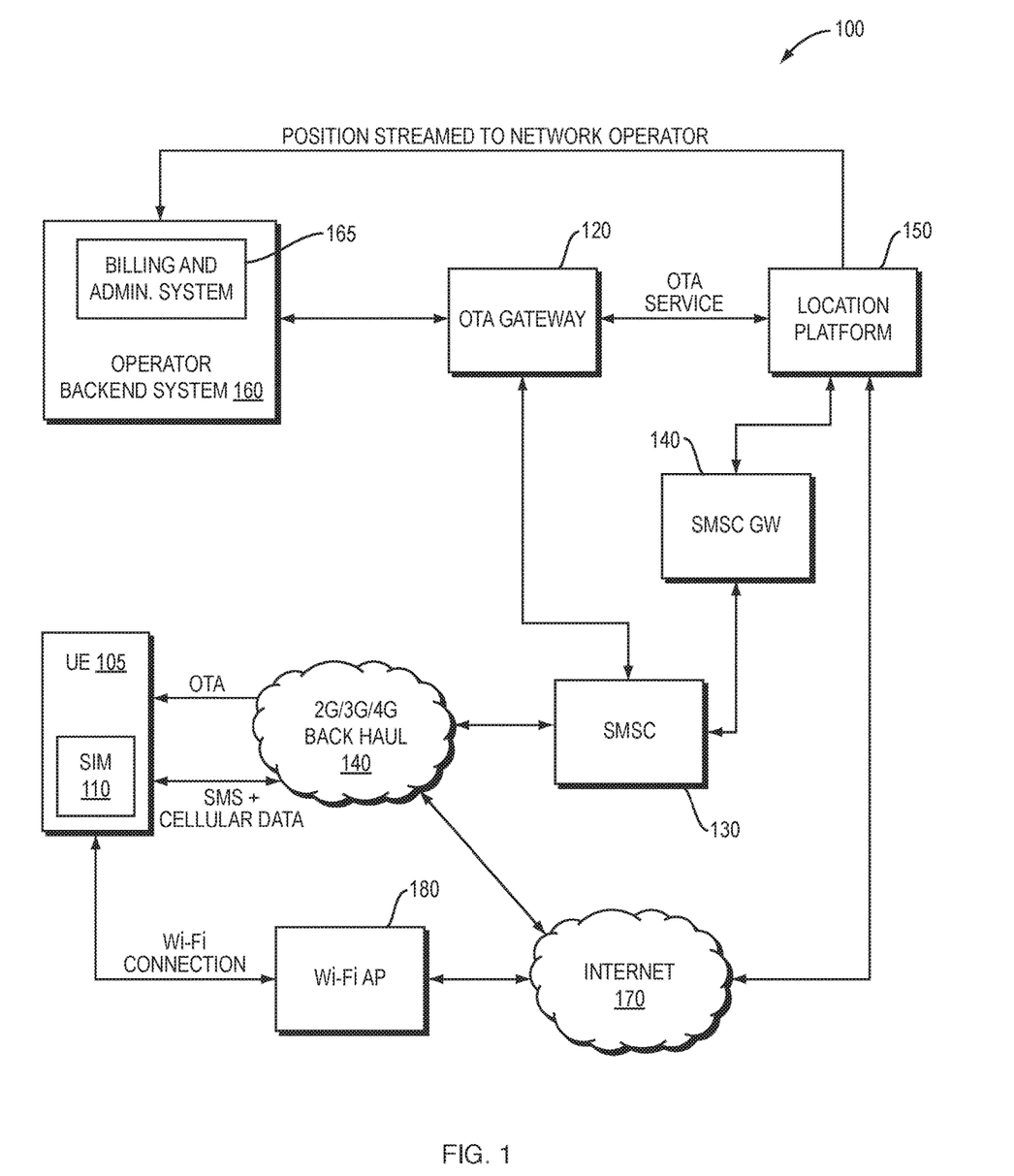
FIG. 1 is a block diagram of an example architecture for determining position of UE involving a SIM-deployed positioning applet.

FIG. 1 is a block diagram of an example architecture for determining position of UE involving a SIM-deployed positioning applet. As used herein, the term "user equipment" or "UE" refers to a mobile device, Machine-to-Machine (M2M) device or Internet of Things (IoT) device operated by an end user. Examples of UE 105 include smartphones, smartwatches, computers, cameras, and sensors operated by end users, among others. The UE 105 includes at least a SIM 110 (e.g., a physical SIM card or an eSIM/iSIM) having a processor (e.g., an integrated processor, or other processor or portion thereof dedicated for use by the SIM) and storage (e.g., an integrated memory, or other memory or portion thereof dedicated for use by the SIM) that provides a secure file system separate from the file system of the UE. The UE 105 has a CPU and main storage (e.g., main memory) that handles application software and the OS, a baseband processor (e.g., a baseband chipset) 112 that handles baseband software generally dealing with cellular radio functions and in some cases also GNSS positioning functions, one or more network interfaces 116 (e.g., a Wi-Fi (i.e., IEEE 802.11) interface), among a number of other components. The physical SIM card or eSIM/iSIM 110 typically interacts and operates with the other components of the UE utilizing mechanisms provided by an application toolkit according to established standards (e.g., 3GPP standards). Such interaction may provide the physical SIM card or eSIM/iSIM 110 connectivity via SMS and optionally Internet Protocol (IP)/Hypertext Transfer Protocol (HTTP) with remote devices, utilizing the baseband processor 112 and/or Wi-Fi interface 116.

A physical SIM card traditionally is provisioned by the network operator with unique subscriber information (e.g., International Mobile Subscriber Identity (IMSI) number and related secret key (Kic)) and algorithms for authentication and encryption thereof, as well as cellular profile, roaming and billing parameters. Further, a physical SIM card may support small applets (e.g., Java applets), which may be provided in an OTA update (e.g., via the SMS or IP connectivity) by a party (typically, the network operator) possessing the secret key, or permanently programmed (i.e. "burned in") during manufacture. These small applets may include a positioning applet 118 used with the present techniques that is provided in an OTA update or burned in during manufacture.

An eSIM/iSIM is similar to a physical SIM card but is embedded directly into UE circuitry rather than provided as a separate card. An eSIM/iSIM is typically provisioned remotely via an OTA update. Often this is a two-step process. First, an OEM downloads one (or more) network operator profiles onto the eSIM/iSIM. Once an operator profile is on the eSIM/iSIM, the associated network operator then downloads onto the eSIM/iSIM subscriber information and cellular profile, roaming and billing parameters to enable access to their network. The OEM typically has the flexibility to, at any moment, download a new operator profile onto the eSIM/iSIM and thereby switch the UE's operator network. Like physical SIM cards, an eSIM/iSIM may support small applets (e.g., Java applets), which may be permanently programmed or provided in an OTA update. These small applets may include a positioning applet 118 used with the present techniques that is provided in an OTA update.

In a typical OTA update, the OTA gateway 120 receives a request from an operator backend system 160 that includes, or provides sufficient information to lookup in a card database, the SIM vendor, the IMSI, the mobile station international subscriber directory Number MSISDN) and secret key of the physical SIM card or eSIM/iSIM 110 to update. The OTA gateway 120 then formats a message that can be understood by the physical SIM card or eSIM/iSIM 110 that includes the positioning applet 118. To achieve this, the OTA gateway 120 typically accesses a set of libraries that contain the formats (including OTA commands) to use for each SIM vendor. The OTA gateway 120 sends a formatted message to the Short Message Service Center (SMSC) 130 which in turn issues as many SMS messages as required to send the positioning applet 118 and required OTA commands. The SMSC 130 delivers the SMS messages over an operator's backhaul network 140 (e.g., a 2G/3G/4G etc. backhaul network) to the physical SIM card or eSIM/iSIM 110 on the UE 105, which in turn unpacks the positioning applet 118 and installs the positioning applet 118 in its storage. The physical SIM card or eSIM/iSIM 110 may respond back to the SMSC 130 to confirm successful operation with one or more OTA responses in SMS messages.

As discussed in more detail below, the positioning applet 118 collects positioning measurements from the baseband processor 112 of the UE and transmits these to a location platform 150. As used herein, the term "positioning measurements" refers to characteristics of observed wireless beacons (e.g., cells) and/or information determined based on observed wireless beacons (e.g., GNSS satellites). For example, positioning measurement may include information such as a serving cell identifier (ID), Neighbor Measurement Report (NMR), GNSS position, etc. The positioning measurements may be encrypted by the positioning applet 118 as part of an encrypted payload of a packet (e.g., using a Triple Data Encryption Algorithm (3DES)). A number of paths may be used to convey the packet to the location platform 150. In an SMS path, the packet is packed into an SMS message, which is transmitted by the baseband processor 112 via the operator's backhaul network 140 (e.g., a 2G/3G/4G etc. backhaul network) to the SMSC 130. The SMSC 130 passes these SMS messages to a SMSC gateway 140 which unpacks the SMS message and provides the packet to the location platform 150 where the positioning measurements in the payload are decrypted.

In a cellular data path, the packet is transmitted as IP/HTTP data by the baseband processor 112 via the operator's backhaul network 140 (e.g., a 2G/3G/4G backhaul network) to the Internet 170, where it is routed to the location platform 150. The location platform 140 decrypts the positioning measurements in the payload.

In a Wi-Fi path, the packet is transmitted by the Wi-Fi interface 116 via a Wi-Fi connection to a Wi-Fi access point (AP) 180. The Wi-Fi AP 180, typically using a cable or digital subscriber line (DSL) modem passes the packet as IP/HTTP data to the Internet 170 where it is routed the location platform 150. The location platform 140 decrypts the positioning measurements in the payload.

The location platform 150 utilizes the positioning measurements (e.g., serving cell ID, NMR and GNSS position, etc.) to determine and estimate position of the UE 105. Depending on the information included in the positioning measurements, various techniques may be used. For example, if a GNSS position is included, the GNSS position may be directly used as the estimated position of the UE 105 (e.g., passed directly a Location Information Management System (LIMS) server). If serving cell ID, NMR or other information is included, the information may be passed to a positioning server host that executes a positioning algorithm (e.g., an Enhance cell ID (ECID) positioning algorithm, a RF Pattern Matching (RFPM) algorithm, a cell ID positioning algorithm, cell fallback or location area code (LAC) fallback positioning algorithm, etc.). The positioning algorithm compares the positioning measurements (e.g., serving cell ID, NMR or other information) to known information (e.g., known cell positions, RF patterns, etc.) in a database to estimate position. The positioning measurements also may be used to update and refine the database, such that the database may be a crowd sourced database.

The estimated position of the UE 105 is provided (e.g., streamed in real-time using JavaScript Object Notation (JSON)) to a designated recipient system, for example, a server of an operator backend system 160, such as a billing and administration system 165. The billing and administration system 165 may use the estimated position of the UE 105 for user tracking users, managing cellular profiles, providing value-added services, and/or for other tasks relevant to the network operator. In some cases, the estimated position of the UE 105 may be provided to multiple designated recipient systems. The UE 105 typically is not directly notified of the estimated position, such that the process is invisible to the end user.

Figure 2:
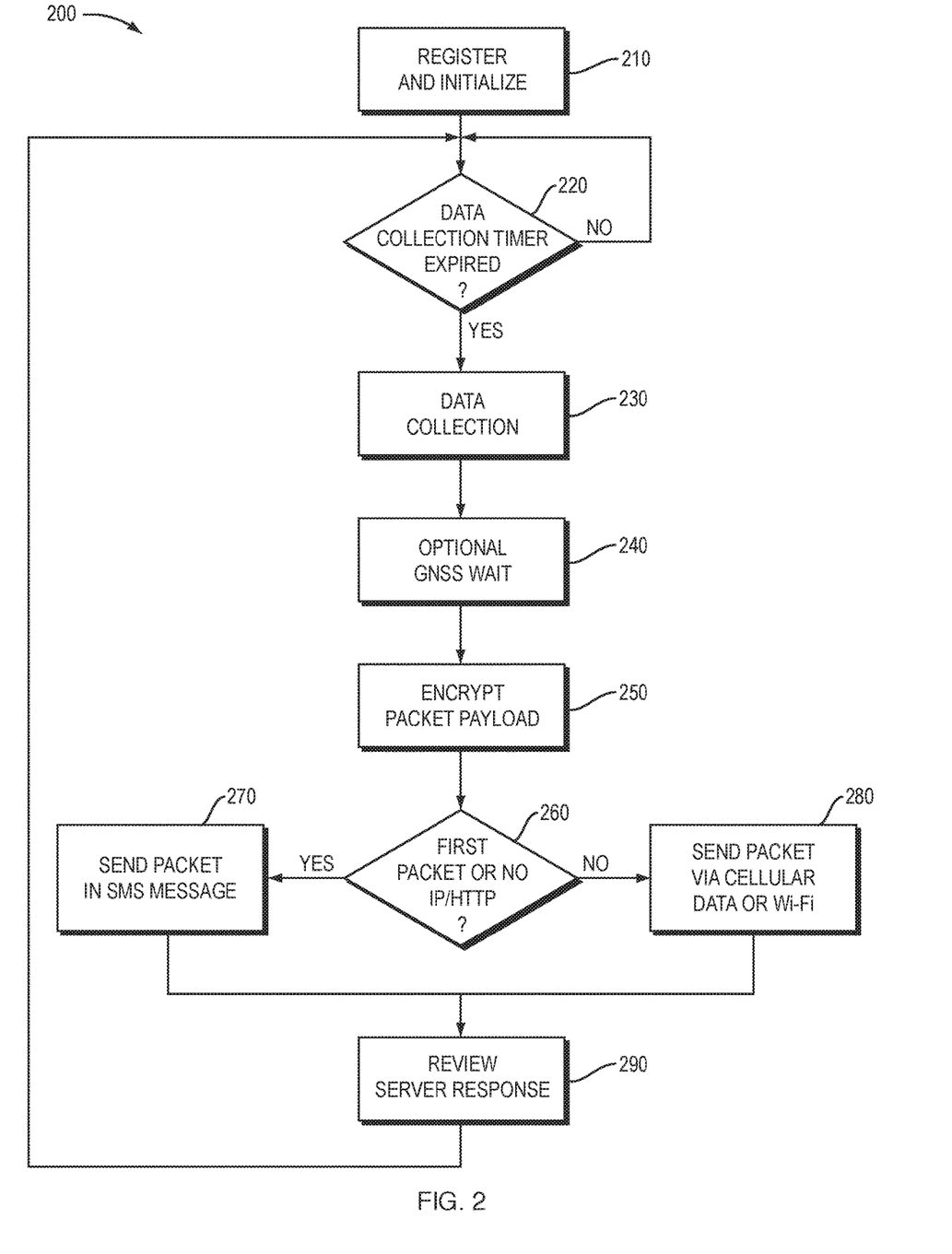
FIG. 2 is a flow diagram detailing example operation of the positioning applet.

FIG. 2 is a flow diagram 200 detailing example operation of the positioning applet 118. To facilitate storage on a physical SIM card or eSIM/iSIM 110, the positioning applet 118 is preferable small, e.g., less than or equal to 5 kilobytes (kb). The positioning applet 118 may be compatible with a variety of UE 105, including those that follow Java Card 2.1+, 3GPPP Release 6+ and other standards. At step 210, the positioning applet 118 registers and initializes. This step may be performed in response to the physical SIM card or eSIM/iSIM 110 powering up, and involve configuring a SMS destination address for the SMSC gateway 140, configuring a IP/HTTP destination address and connection to the location platform 150, checking for baseband processor 112 capabilities and features, initializing a data collection timer to run for a default period (e.g., for 30 seconds (s)), and configuring encryption keys (e.g., 3DES keys) for encrypting positioning measurements in an encrypted payload. At step 220, the positioning applet 118 determines whether the data collection timer has expired. The data collection timer may be using the default period set in step 210, or an updated period provided by the location platform 150, as discussed further below. When the data collection timer expires, execution proceeds to step 230, where the positioning applet 118 collects device identifiers and positioning measurements. As part of step 230, the positioning applet 118 may trigger collection of MSISDN and/or other identifiers from the physical SIM card or eSIM/iSIM, and serving cell ID, NMR, signal strength, time, other measurements, and, if supported, a GNSS position, from the baseband processor 112 (e.g., via 3GPP protocols).

Some measurements may be available substantially immediately. However, for GNSS position it may take the baseband processor 112 additional time to estimate position, if successful. At step 240, if GNSS positioning is supported, the positioning applet 118 waits for expiration of a GNSS timer that delays for a configurable period of time (e.g., 10-15 s) to allow for the baseband processor 112 to return a GNSS position. If a GNSS position is not returned when the GNSS timer expires, execution proceeds without it.

At step 250, the positioning applet 118 encrypts the positioning measurements (e.g., using 3DES). The secret key may be embedded within the positioning applet 118 and configured to be unique for each EU.

At step 260, the positioning applet 118 determines whether the positioning measurements are the first since registration/initialization or if no IP/HTTP connectivity via cellular data or Wi-Fi is available. If so, execution proceeds to step 270, where the positioning applet 118 sends the encrypted positioning measurements in an SMS message via the operator's backhaul network 140 (e.g., 2G/3G/4G etc. backhaul network) to the SMSC 130. Use of the SMS path for the first positioning measurements after registration/initialization may permit the location platform 150 to learn the MSISDN of the UE 104. If not, execution proceeds to step 270, where the positioning applet 118 sends the encrypted positioning measurements as cellular data via the operator's backhaul network 140 (e.g., 2G/3G/4G etc. backhaul network) or via a Wi-Fi connection to a Wi-Fi AP 180. If such a cellular data or a Wi-Fi path should fail, the positioning applet 118 may revert to the SMS path.

At step 290, the positioning applet 118 receives, via the SMS, cellular data or Wi-Fi path a response from the location platform 150. The response may include an acknowledgement (ACK) that the positioning measurements were received, as well as configuration information for the applet (e.g., a new data collection timer period to use) that may be implemented for a next iteration of the steps.

Figure 3:
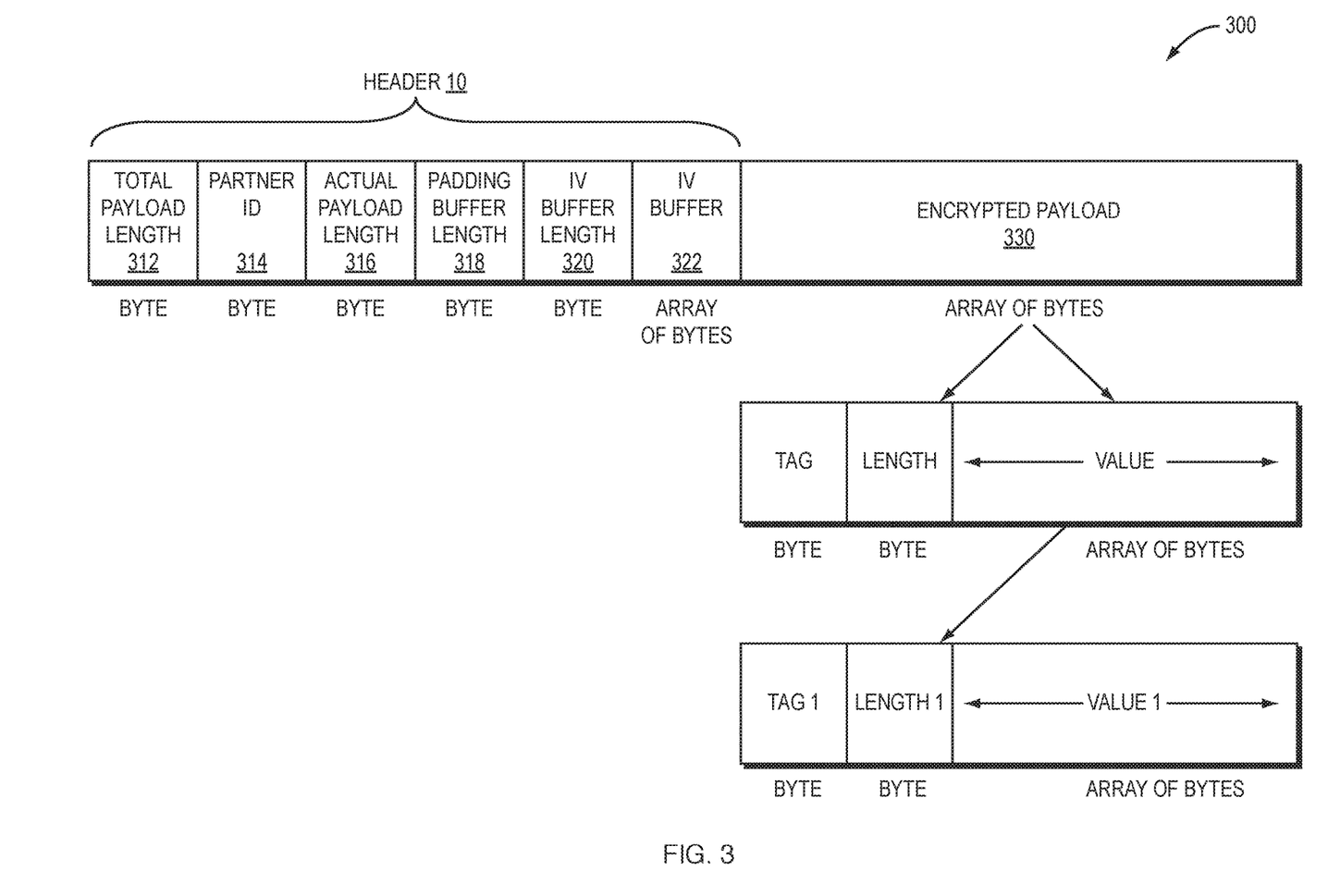
FIG. 3 is a schematic diagram of an example packet format that may be used to store positioning measurements for transmission in a short message service (SMS) message or via cellular data or a Wi-Fi connection.

FIG. 3 is a schematic diagram of an example packet format 300 that may be used to store positioning measurement for transmission in a SMS message or via cellular data or Wi-Fi connection. When using SMS, the packet size may be kept to a maximum of 140 bytes (e.g., to allow singing in a single SMS message). When using cellular data or Wi-Fi, packet size may be permitted up to a larger size (e.g., 255 bytes). The positioning applet 118 may populate as many fields as possible with available positioning measurements within the size constraints, prioritizing the including of positioning measurements necessary to estimate a position of the UE 105 over data mainly of use in crowd sourcing the database at the location platform 150 (e.g., if a GNSS position is available its inclusion may be prioritized over sending cell ID and NMR since in this case such data may be mainly used to crowd source the database). The packet format 300 includes a header portion 310 that may include a total payload length 312, a partner ID 314, an actual payload length 316, a padding buffer length 318, an Initialization Vector (IV) buffer length 320, and an IV buffer 322. The IV buffer 322 may store an input to a cryptographic primitive of an encryption algorithm (e.g., 3DES) used with an encrypted payload 330 of the packet.

The encrypted payload 330 may include a number of fields encoded using type-length-value (TLV) encoding with fields concatenated. A DateTime field may include a timestamp when the position measurements were collected. An International Mobile Equipment Identity (IMEI) field may include a number that uniquely identifies the UE 105. An IMSI field may include a unique subscriber number allocated to the physical SIM card or eSIM/iSIM 110 by the network operator. A CellID field may include the cell ID of the serving cell obtained from the baseband processor 112 that may be used to estimate position of the UE 105. An Access Technology field may include the air interface type (e.g., 2G/3G/4G etc.) used by the serving cell. An NMR field may include reports that indicate all neighboring cells observed by the baseband processor 112 and their received signal strengths (RSS) that may be used to estimate position of the UE 105, as well as to crowd source the database at the location platform 150. The NMR may be encoded using Abstract Syntax Notation One (ASN1). A Timing Measurement field may include a timing measurement associated with the serving cell. A Periodicity field may include an indication of the period used by of the data collection timer to collect positioning measurements. Still further, a GeoLocation filed may include a GNSS position determined by the baseband processor 112 that may be used as the estimated position of the UE 105 as well as to crowd source the database at the location platform 150.

Figure 4:
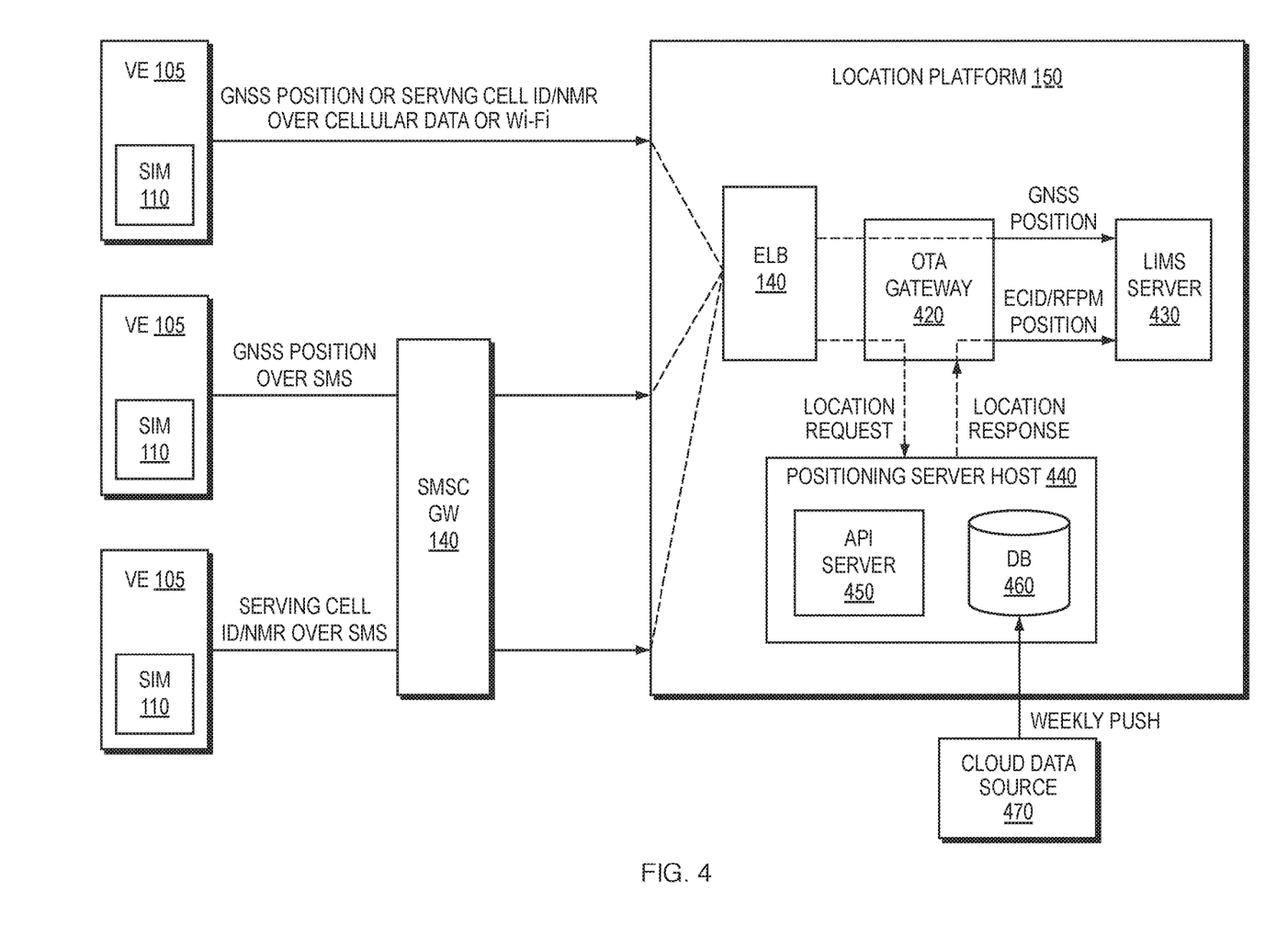
FIG. 4 is a block diagram showing details of an example location platform and data flow therein.

FIG. 4 is a block diagram showing details of an example location platform 150 and data flow therein. Positioning measurements are provided to the location platform 150 utilizing the above discussed packet format in a SMS message via the SMC gateway 140 or via a cellular data or Wi-Fi path. The positioning measurements are received by an elastic load balancer (ELB) 410 of the location platform 150 that distributes incoming measurements across one or more OTA gateways 420. An OTA gateway 420 is responsible for monitoring incoming positioning measurements, decrypting them and routing the positioning measurements based on their contents. If the positioning measurements include GNSS position, the GNSS position may be provided directly to a LIMS server 430 (e.g., via File Transfer Protocol (FTP)) as an estimated position of the UE 105. If the positioning measurements includes serving cell ID, NMR or other information requiring processing to estimate location, and/or that can be used in crowd sourcing the database, the information may be included in a location request sent to an API 450 of positioning server host 440. The positioning server host 440 may employ a positioning algorithm (e.g., an ECID positioning algorithm, an RFPM positioning algorithm, a cell ID positioning algorithm, cell fallback or LAC fallback positioning algorithm, etc.) that compares the positioning measurements (e.g., serving cell ID, NMR or other information) to a database 460 of known information and estimates therefrom a position of the UE 105. As part of the estimating, the positioning algorithm may also update data in the database to crowd source its contents. The database 460 may also be periodically updated (e.g., by a weekly push) from an external cloud data source. The estimated position of the UE 105 is provided via the API 450 back to the OTA gateway 420 and provided (e.g., via FTP to the LIMS server 430. The LIMS server 430 may provide (e.g., stream in real-time) the estimated position of the UE 105 to a designated recipient, for example, a billing and administration system 165 of an operator backend system 160, or multiple designated recipients. The LIMS server 430 may also perform analysis and campaign tracking and provide higher level analytics and metrics to one or more designated recipients. The estimated position may be withheld from the UE 105 itself, such that operations may occur silently without user notification.

Figure 5:
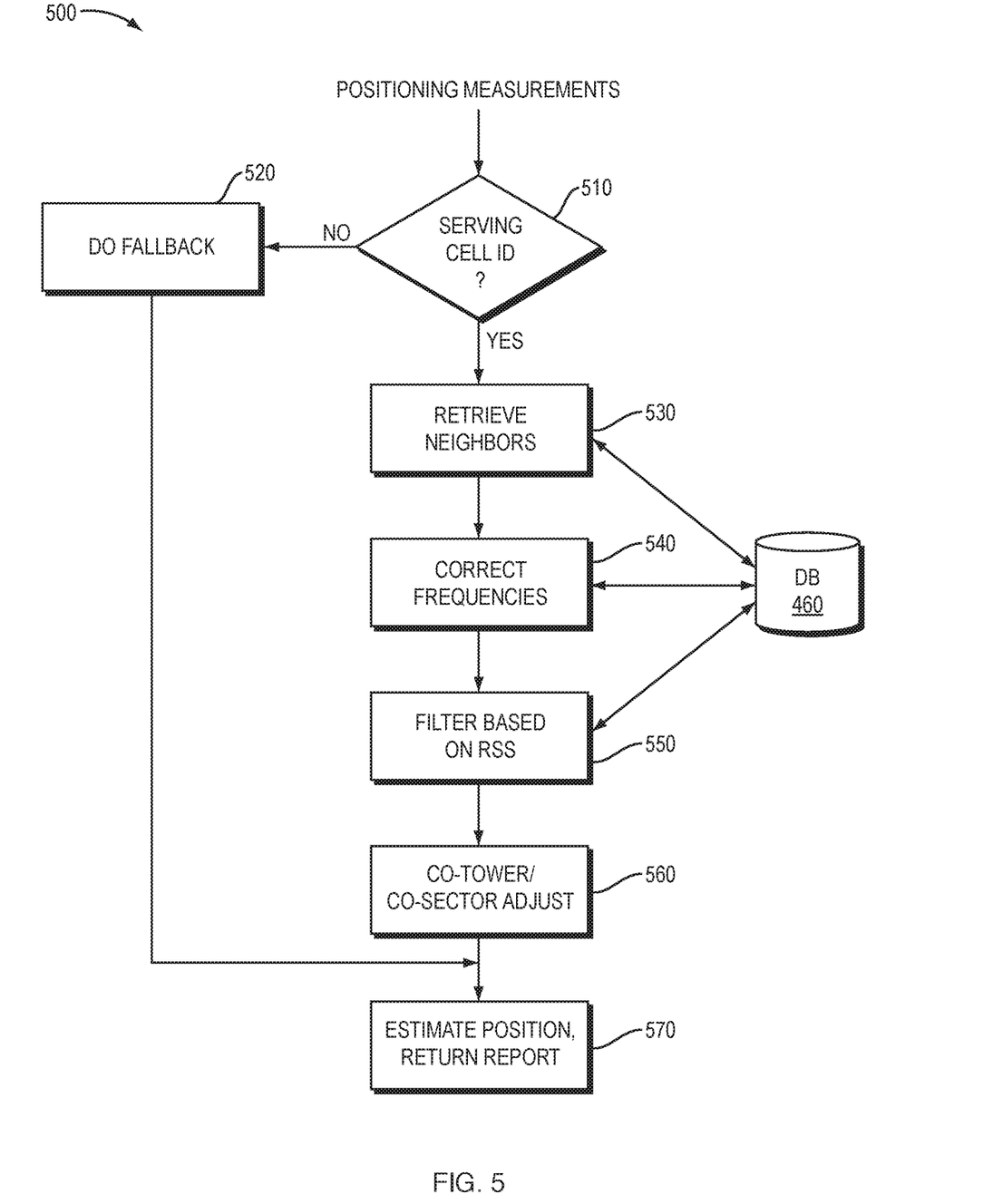
FIG. 5 is a flow diagram of an example ECID positioning algorithm that also utilizes NMR data that may be implemented by a positioning server host of the location platform.

FIG. 5 is a flow diagram 500 of an example ECID positioning algorithm that also utilizes NMR data that may be implemented by the positioning server host 440 of the location platform 150. In general, multiple RSS measurements from cells are used in a weighted triangulation to estimate UE position. An NMR provides useful RSS measurements but often only partially identifies the cells (e.g., only indicate physical cell ID (PCI) and absolute frequency number) making it difficult to use the RSS measurements. However, when a partial identity is used with supplemental information in the database 460 (e.g., obtained from crowd sourcing), the identity of the cell can be inferred and the known cell position and RSS can be used in position estimation, enabling use of RSS measurements that would otherwise be unusable At step 510, the positioning algorithm checks if the location request includes a serving cell ID and whether this serving cell ID is known in the database 460. If not, execution proceeds to step 520, and the positioning algorithm reverts to a fallback positioning method such as cell fallback or LAC fallback positioning. If so, the positioning algorithm, based on the serving cell, retrieves from the database 460 all known neighbors whose partially identify matches the NMR within a predetermined distance (e.g., a 5 kilometer (km) radius) of the serving cell. At step 540, the positioning algorithm adjusts and corrects measured cell signal strength based on cell frequency path loss. Some measurements have significant transmission frequency differences which causes a difference in the propagation loss, which can be corrected by introducing a frequency offset correction if the frequency is known. At step 550, the positioning algorithm uses a signal strength filter to filter out cells with RSS outside of predetermined lower and upper limits (e.g., −72 dBm and −122 dBm) to remove those with a signal too weak to be useful or too strong such that noise and interference dominate. At step 560, the positioning algorithm determines if any two cells belong to the same tower (e.g., by checking if they have the same frequency and a PCI differing by 2 or less) or same sector (by checking if they have a different frequency and same PCI), and if so, their weights are adjusted before triangulation (e.g., to down-weight co-sectored cells since some information may be redundant relative to other cells being considered, and to up-weight co-towered cells since UE position is more likely to be in-between the two cells given that cells are often directional and cell locations are biased towards serving areas). Finally, at step 570, the positioning algorithm performs a triangulation based on the known cells and their adjusted signal strengths and weights to estimate position of the UE 105, and the positioning algorithm returns a position response with the estimated position.

Figure 6:
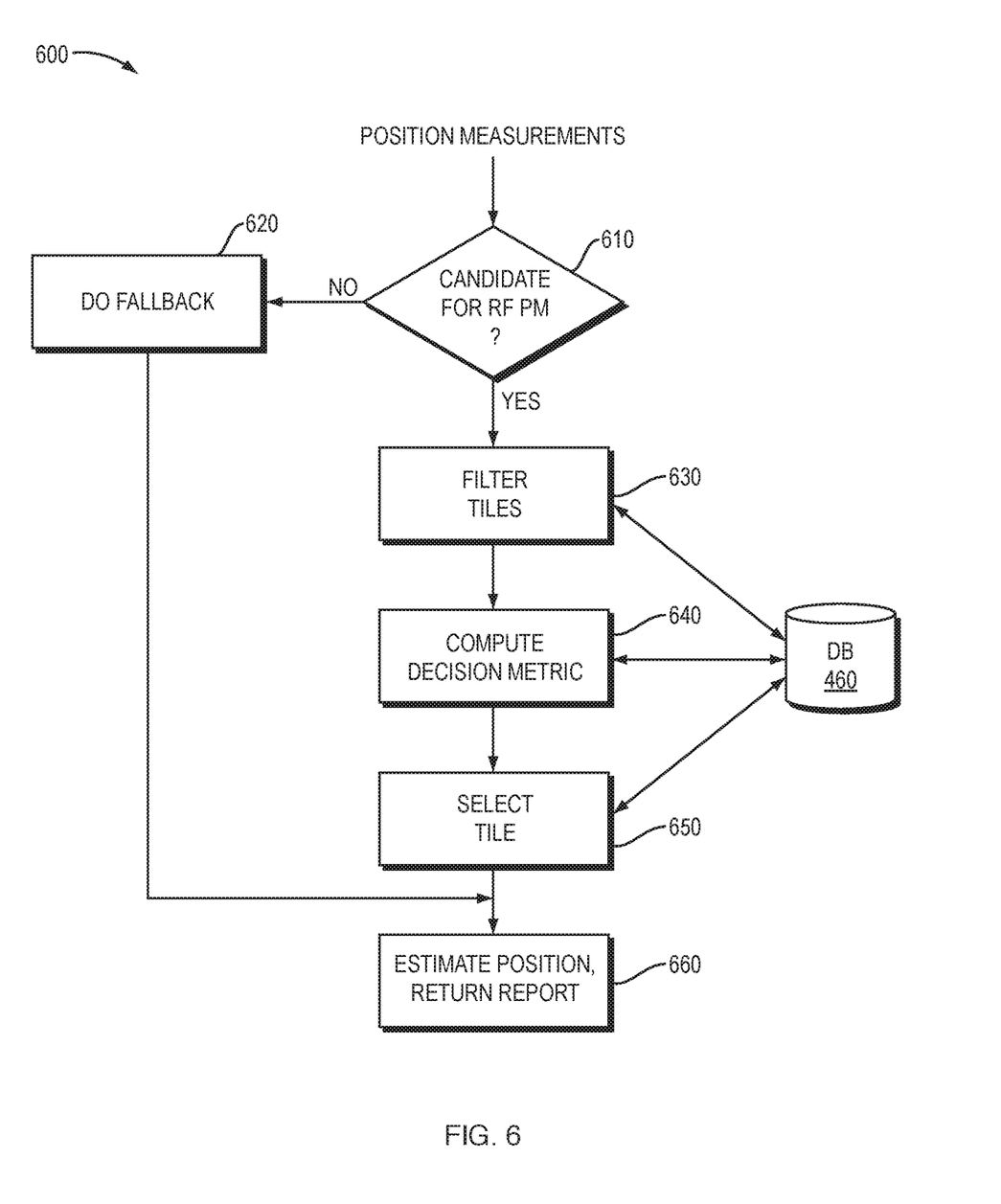
FIG. 6 is a flow diagram of an example RFPM positioning algorithm that may be implemented by the positioning server host of the location platform.

FIG. 6 is a flow diagram 600 of an example RFPM positioning algorithm that may be implemented by the positioning server host 440 of the location platform 150. A RFPM positioning algorithm is an alternative to an ECID positioning algorithm and is based on matching RF patterns observed by the UE 105 to known RF patterns stored in the database 460 (e.g., obtained from crowd sourcing). The known patterns may be linked to predefined areas referred to as "tiles", with measurements for each tile consolidated. RFPM may have accuracy that is greater than ECID and thereby be preferred when sufficient positioning measurements are available. At step 610, the positioning algorithm determines whether the location request includes sufficient information for pattern matching (e.g., serving cell ID, NMR and timing measurements). If not, execution proceeds to step 620, and the system everts to a fallback positioning method. If so, at step 630 the positioning algorithm filters the tiles of the database 460 to reduce the tiles to a subset of possible tiles. A multi-level filtering algorithm may be used in which strict criteria are applied followed by less strict criteria in the event the prior criteria did not return any possible tiles. For example, the positioning algorithm may add to the subset any tiles having a serving cell ID and timing matching that observed by the UE 105 where timing is between minimum and maximum values associated with the tile. If no tiles satisfy these criteria, the positioning algorithm may then add to the subset tiles having a serving cell ID matching that observed by the UE 105 while ignoring timing. If still no tiles satisfy these criteria, the positioning algorithm may then add all tiles to the subset. At step 640, the positioning algorithm computes a decision metric to determine which tile in the subset is most likely to match the RF patterns observed by the UE 105. The decision metric may consider timing, RSS, number of matching measurements and/or other factors. At step 650, the positioning algorithm selects the tile with the best decision metric. Finally, at step 660, the positioning algorithm returns a position associated with the best tile as the estimated position of the UE 105 in a position response.

It should be understood that in addition to ECID and RFPM positioning algorithms, a variety of other positioning algorithms may alternatively be used, including a cell ID (CID) positioning algorithm that uses just the known cell position of the serving cell stored in the database to estimate UE position, a cell fallback positioning algorithm, a location area code (LAC) fallback positioning algorithm, or another algorithm.

The above description details techniques for determining position of UE involving a SIM-deployed positioning applet. It should be understood that the techniques and portions thereof may be utilized together, individually, or in combination with other techniques, depending on the implementation. Further, it should be understood that aspects of the techniques may be modified, added to, removed, or otherwise changed depending on the implementation. Further, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory electronic device-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method for determining position of user equipment (UE), comprising:
  executing a positioning applet on a subscriber identification module (SIM) of the UE;
  collecting, by the positioning applet executing on the SIM, positioning measurements from a baseband processor of the UE, the positioning measurements including at least (i) a serving cell identifier (ID) and a neighbor measurement report (NMR) indicating characteristics of observed neighboring cells and/or (ii) a Global Navigation Satellite System (GNSS) position estimated based on observed GNSS satellites;
  packing, by the positioning applet executing on the SIM, the positioning measurements from the baseband processor into a pay load of a packet; and
  transmitting the packet from the UE via a communication path to a location platform that estimates the position of the UE based on the positioning measurements,
  wherein the executing the positioning applet is performed on the SIM without support of application, operating system (OS), or baseband software executing on a central processing unit (CPU) or the baseband processor of the UE.

2. The method of claim 1, wherein the SIM is a physical SIM card.

3. The method of claim 2, wherein the positioning applet is permanently programed into the physical SIM card.

4. The method of claim 2, further comprising:
  installing the positioning applet on the physical SIM card in response to an over-the-air (OTA) update received by the baseband processor from a backhaul network.

5. The method of claim 1, wherein the SIM is an embedded SIM (eSIM) or an integrated (iSIM).

6. The method of claim 5, further comprising:
  installing the positioning applet on the eSIM or iSIM in response to an over-the-air (OTA) update received by the baseband processor from a backhaul network.

7. The method of claim 5, wherein the positioning applet is permanently programed into the eSIM or iSIM.

8. The method of claim 1, wherein the positioning measurements include at least the serving cell ID and the NMR, and the location platform estimates by at least one of an enhance cell ID (ECID) positioning algorithm that uses multiple received signal strength (RSS) measurements for cells in the positioning measurements and known cell positions stored in a database in a weighted triangulation to estimate UE position, a radio frequency pattern matching (RFPM) positioning algorithm that matches radio frequency (RF) patterns observed in the positioning measurements to known RF patterns stored in the database to estimate UE position or a cell ID (CID) positioning algorithm that uses the known cell position of the serving cell stored in the database to estimate UE position.

9. The method of claim 8, wherein the database is a crowd sourced database and the location platform both uses the positioning measurements to estimate position of the UE and update the crowd sourced database.

10. The method of claim 1, wherein the positioning measurements include at least the GNSS position, and the location platform estimates position of the UE by using the GNSS position as the estimated position.

11. The method of claim 1, wherein the packing comprises encrypting the positioning measurements in an encrypted payload.

12. The method of claim 1, wherein communication path is a short message service (SMS) path, the packet is sized to fit within a SMS message, and the transmitting comprises transmitting the SMS message by the baseband processor of the UE via a backhaul network to a short message service center (SMSC).

13. The method of claim 1, wherein the communication path is a cellular data path, and the transmitting comprises transmitting the packet by the baseband processor of the UE via a backhaul network to the Internet.

14. The method of claim 1, wherein the communication path is a Wi-Fi path and the transmitting comprises transmitting the packet by a Wi-Fi interface of the UE to a Wi-Fi access point (AP).

15. A method for determining position of user equipment (UE), comprising:
deploying a positioning applet on a subscriber identification module (SIM) of the UE that is configured to collect positioning measurements from a baseband processor of the UE and transmit the positioning measurements to a location platform, the positioning measurements including at least (i) a serving cell identifier (ID) and a neighbor measurement report (NMR) indicating characteristics of observed neighboring cells and/or (ii) a Global Navigation Satellite System (GNSS) position estimated based on observed GNSS satellites;
receiving, by a backend system of a network operator, an estimated position of the UE from the location platform based on the positioning measurements; and
using, by the backend system of a network operator, the estimated position of the UE to at least one of track users, manage cellular profiles, or provide value-added services,
wherein the deploying the positioning applet omits installation of application, operating system (OS), or a baseband software into main memory of the UE.

16. The method of claim 15, wherein the deploying comprises permanently programming the positioning applet into the SIM during manufacture.

17. The method of claim 15, wherein the deploying comprises performing an over-the-air (OTA) update including the positioning applet.

18. The method of claim 17, wherein the performing the OTA update further comprises:
providing, by the backend system, a request to an OTA gateway;
formatting, by the OTA gateway, a message for the SIM that includes the positioning applet;
providing the formatted message to a short message service center (SMSC); and
issuing, by the SMSC, one or more short message service (SMS) messages that include contents of the formatted message and commands to update the SIM.

19. The method of claim 15, wherein the positioning measurements include at least the serving cell ID and the NMR, and the estimated position of the UE is provided by at least one of an enhance cell ID (ECID) positioning algorithm, a radio frequency pattern matching (RFPM) positioning algorithm or a cell ID (CID) positioning algorithm.

20. The method of claim 15, wherein the positioning measurements include at least the GNSS position, and the estimated position of the UE is the GNSS position.

21. The method of claim 15, wherein the receiving the estimated position further comprises receiving a real-time stream that includes the estimated position of the UE.

22. A method for determining position of user equipment (UE), comprising:
receiving, by a location platform from a positioning applet executing on a subscriber identification module (SIM) of the UE via a communication path and absent of execution on a central processing unit (CPU) or a baseband processor of the UE, positioning measurements for the UE, the positioning measurements including at least (i) a serving cell identifier (ID) and a neighbor measurement report (NMR) indicating characteristics of observed neighboring cells and/or (ii) a Global Navigation Satellite System (GNSS) position estimated based on observed GNSS satellites;
estimating, by the location platform, the position of the UE based on the positioning measurements; and
providing an estimated position of the UE to a designated recipient system separate from the UE without notification to the user of the UE.

23. The method of claim 22, wherein the positioning measurements include at least the serving cell ID and the NMR, and the estimating further comprises:
using at least one of an enhance cell ID (ECID) positioning algorithm that uses multiple received signal strength (RSS) measurements for cells in the positioning measurements and known cell positions stored in a database in a weighted triangulation to estimate UE position, a radio frequency pattern matching (RFPM) positioning algorithm that matches radio frequency (RF) patterns observed in the positioning measurements to known RF patterns stored in the database to estimate UE position, or a cell ID (CID) positioning algorithm that uses the known cell position of the serving cell stored in the database to estimate UE position.

24. The method of claim 23, wherein the database is a crowd sourced database and the method further comprises:
updating the crowd sourced database based on the positioning measurements, such that the positioning measurements are used both to estimate position of the UE and to update the crowd sourced database.

25. The method of claim 22, wherein the positioning measurements including at least the GNSS position, and the estimating further comprises:
using the GNSS position as the estimated position.

26. The method of claim 22, wherein the positioning measurements are included in an encrypted payload, and the method further comprises:
decrypting the encrypted payload.

27. The method of claim 22, wherein the communication path is a short message service (SMS) path, and the receiving receives a SMS message that includes the positioning measurements using a short message service center (SMSC) gateway.

28. The method of claim 22, wherein the communication path is a cellular data path, and the receiving receives a packet that traveled over a backhaul network and the Internet to the location platform.

29. The method of claim 22, wherein the communication path is a Wi-Fi path and the receiving receives a packet that traveled over a Wi-Fi network and the Internet to the location platform.

30. A subscriber identification module (SIM) configured for determining position of user equipment (UE), comprising:
    storage configured to store a positioning applet; and
    a processor configured to execute the positioning applet on the SIM, the positioning applet configured, when executed on the SIM, to
        collect positioning measurements from a baseband processor of the UE, the positioning measurements including at least (i) a serving cell identifier (ID) and a neighbor measurement report (NMR) indicating characteristics of observed neighboring cells and/or (ii) a Global Navigation Satellite System (GNSS) position estimated based on observed Global Navigation Satellite System (GNSS) satellites,
        pack the positioning measurements into a payload of a packet, and
        cause the packet to be transmitted from the UE via a communication path to a location platform that estimates the position of the UE based on the positioning measurements,
    wherein the positioning applet is configured to execute solely on the processor of the SIM without support of application, operating system (OS), or baseband software executing on a central processing unit (CPU) or the baseband processor of the UE.

31. The SIM of claim 30, wherein the positioning applet is permanently programed into the storage of the SIM.

32. The SIM of claim 30, wherein the positioning applet is stored in the storage of the SIM in response to an over-the-air (OTA) update.

33. The SIM of claim 30, wherein the positioning measurements include at least the serving cell ID and the NMR.

34. The SIM of claim 30, wherein the positioning measurements include at least the GNSS position.

35. The SIM of claim 30, wherein the communication path is at least one of a short message service (SMS) path, a cellular data path or a Wi-Fi path.

36. A non-transitory electronic device readable media having software that is a positioning applet stored thereon, the software, when executed on a processor of a subscriber identification module (SIM) of user equipment (UE) and absent execution on a central processing unit (CPU) or a baseband processor of the UE, operable to:
    collect positioning measurements, the positioning measurements including at least (i) a serving cell identifier (ID) and a neighbor measurement report (NMR) indicating characteristics of observed neighboring cells and/or (ii) a Global Navigation Satellite System (GNSS) position estimated based on observed Global Navigation Satellite System (GNSS) satellites;
    pack the positioning measurements into a payload of a packet; and
    cause transmission of the packet from the UE via a communication path to a location platform that estimates the position of the UE based on the positioning measurements.

37. The non-transitory electronic device readable media of claim 36, wherein the positioning applet is permanently programed into the non-transitory electronic device readable media.

38. The transitory electronic device readable media of claim 36, wherein the positioning applet is stored in the non-transitory electronic device readable media in response to an over-the-air (OTA) update.

39. The transitory electronic device readable media of claim 36, wherein the communication path is at least one of a short message service (SMS) path, a cellular data path or a Wi-Fi path.

40. A method for determining position of user equipment (UE), comprising:
    installing a positioning applet on a subscriber identification module (SIM) of the UE in response to an over-the-air (OTA) update received by a baseband processor of the UE from a backhaul network;
    executing the positioning applet on the SIM;
    collecting, by the positioning applet executing on the SIM, positioning measurements from the baseband processor of the UE, the positioning measurements including both:
        characteristics of cells observed by the baseband processor, and
        information determined based on observed Global Navigation Satellite System (GNSS) satellites;
    packing, by the positioning applet executing on the SIM, the positioning measurements from the baseband processor into a payload of a packet; and
    transmitting the packet from the UE via a communication path to a location platform that estimates the position of the UE based on the positioning measurements,
    wherein the executing the positioning applet is performed solely on the SIM without support of application, operating system (OS), or baseband software executing on a central processing unit (CPU) or the baseband processor of the UE.

* * * * *